C. L. Ballinger.
Securing Covers to Glass Ware.
No. 87,318. Patented Mar. 2, 1869.

Witnesses:
C. C. Wilson
Edmund Masson

Inventor:
Chas. L. Ballinger
By A. V. B. Stoughton — Atty

United States Patent Office.

CHARLES BALLINGER, OF PITTSBURG, PENNSYLVANIA, ASSIGNOR TO McKEE AND BROTHERS, OF SAME PLACE.

Letters Patent No. 87,318, dated March 2, 1869.

IMPROVED METHOD OF SECURING COVERS TO GLASS PITCHERS.

The Schedule referred to in these Letters Patent and making part of the same.

*To all whom it may concern:*

Be it known that I, CHARLES BALLINGER, of Pittsburg, in the county of Allegheny, and State of Pennsylvania, have invented certain new and useful Improvements in the Manner of Securing Metal or other Tops to Glass Pitchers or other glass-ware; and I do hereby declare the following to be a full, clear, and exact description of the same, reference being had to the accompanying drawings, making a part of this specification, in which—

Similar letters of reference, where they occur in the separate figures, denote like parts in all the drawings.

The object and purpose of this invention is to obtain a cheaper and more efficient mode of fastening metal or other covers or tops on glass pitchers and other glass-ware; and The nature of my invention consists in a recess in the glass, to receive the spring, and a flanged strap, or its equivalent, for connecting the cover to the spring.

And the invention further consists in the combination of the shield, strap, and hinge, with the cover, for forming, in connection with the spring, a fastening to the glass-ware, and for covering and protecting the parts, as will be explained.

To enable others skilled in the art to make and use my invention, I will proceed to describe the same, with reference to the drawings.

A represents a glass pitcher, which is moulded or formed in any of the usual well-known moulds.

Near the top of the mould, before moulding the article of glass-ware, are placed two pins, or studs, that incline toward each other, or toward the centre of the pitcher or other article to be moulded, so that when the glass is moulded, and the pins or studs withdrawn, there will be under-cut recesses, $a\ a$, in the glass.

There is also placed in the mould, at or near the same points with the pins or studs, a core or plate, that will, when the glass-ware is moulded, leave a recess in the glass, as shown at $b$.

The metal or other cover, B, has a hinge, as at $c$, and a flap, $d$, beyond the hinge, which, though forming a small part of the cover, is stationary, and may be regarded as a part of the connecting-devices, by which the cover is attached and held to the pitcher or other article.

Figure 1:
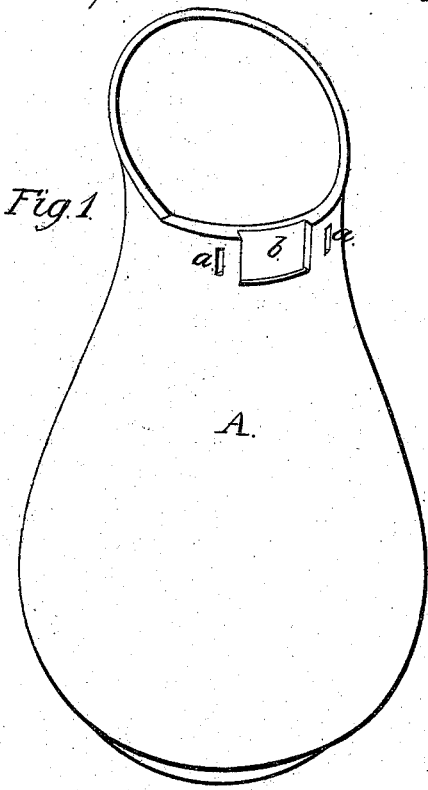
Figure 1 represents a perspective view of a glass pitcher with the cover removed, to show the depressions therein, by which the cover is connected to it.
Figure 2:
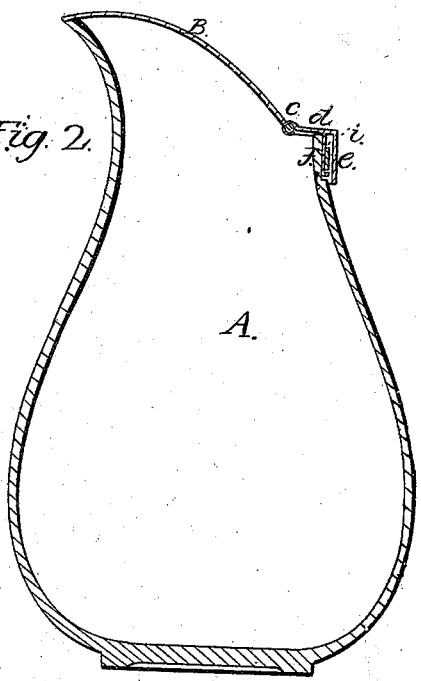
Figure 2 represents a vertical section through the cover-hinge and connections, and through the pitcher.
Figure 4:
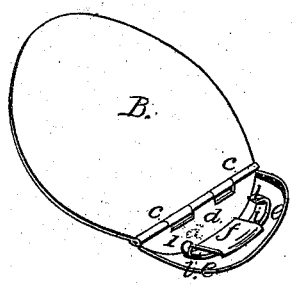
Figure 4 represents a perspective view of the under side of the cover and its connected parts, as removed from the pitcher or other article of glass to which it is applicable.

To the rear of this piece $d$ there is attached a curved shield, $e$, which fits around the glass-ware; and inside of this shield $e$ there is a strap, $f$, the lower edge of which is flanged or turned, as shown at figs. 2, 4, so as to catch over or hold to the spring $i$ when it is in its place.

Figure 3:
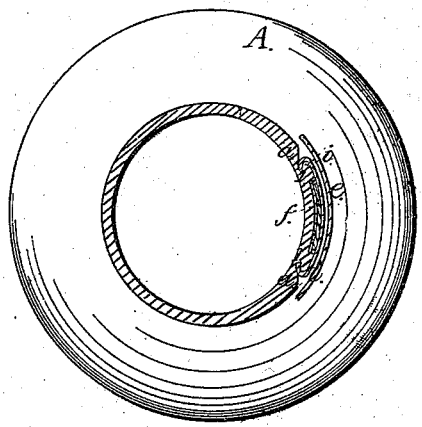
Figure 3 represents a horizontal section through the pitcher and the cover-fastening.

The spring $i$ is slightly curved, to fit the curvature of the pitcher or other article of glass, and its ends 1 1 are bent or hooked, so as to take into and hold itself firmly to the glass, by entering the recesses $a\ a$, as shown in fig. 3.

The spring $i$ having been hooked into the recesses, the cover is then connected to the spring by pressing the rear pieces $e\ f$ past the spring, the latter lying or between them. When pressed down, until the flange or catch on the strap $f$ takes under the spring, the cover is secured thereto, and the spring being grasped or locked into the glass, a firm connection between the article of glass and the cover is thereby made.

The recess $b$ in the glass, is for the strap $f$ to lie in, thus making a very neat, as well as a very efficient mode of fastening.

Having thus fully described my invention,

What I claim, is—

In combination with a glass pitcher or other article of glass, with recesses $a\ a$ moulded therein, the spring $i$, with its bent or hooked ends, for being united thereto, and forming a medium by which the cover may be attached and held, substantially as described.

Also, in combination with the cover B, the hinge, strap, and shield, for the purpose of connecting it to and using said cover in connection with a pitcher or other glass-ware, substantially as described.

CHARLES BALLINGER.

Witnesses:
WILLIAM S. CALDWELL,
JNO. B. KENNEDY.